(12) United States Patent
Mott et al.

(10) Patent No.: US 10,147,399 B1
(45) Date of Patent: Dec. 4, 2018

(54) ADAPTIVE FIDUCIALS FOR IMAGE MATCH RECOGNITION AND TRACKING

(71) Applicant: A9.com, Inc., Palo Alto, CA (US)

(72) Inventors: David Creighton Mott, Los Altos, CA (US); Scott Paul Robertson, Mountain View, CA (US); Arnab Sanat Kumar Dhua, Mountain View, CA (US); William Brendel, San Francisco, CA (US); Nityananda Jayadevaprakash, San Jose, CA (US)

(73) Assignee: A9.COM, INC., Palo Alto, CA (US)

( * ) Notice: Subject to any disclaimer, the term of this patent is extended or adjusted under 35 U.S.C. 154(b) by 7 days.

(21) Appl. No.: 14/475,333

(22) Filed: Sep. 2, 2014

(51) Int. Cl.
| | |
|---|---|
| *G09G 5/377* | (2006.01) |
| *G06K 9/62* | (2006.01) |
| *G06K 9/46* | (2006.01) |
| *G06F 17/30* | (2006.01) |

(52) U.S. Cl.
CPC ....... *G09G 5/377* (2013.01); *G06F 17/30244* (2013.01); *G06K 9/4604* (2013.01); *G06K 9/6202* (2013.01)

(58) Field of Classification Search
None
See application file for complete search history.

(56) References Cited

U.S. PATENT DOCUMENTS

| | | | |
|---|---|---|---|
| 8,429,173 B1* | 4/2013 | Rosenberg | G06F 17/30247 707/748 |
| 2011/0199479 A1* | 8/2011 | Waldman | G01C 21/3602 348/116 |
| 2013/0110620 A1* | 5/2013 | Zhu | G06F 17/30244 705/14.49 |
| 2014/0015858 A1* | 1/2014 | Chiu | G09G 5/026 345/633 |
| 2014/0058825 A1* | 2/2014 | Raman | G06Q 30/02 705/14.42 |
| 2014/0225919 A1* | 8/2014 | Kaino | G06T 19/006 345/633 |

* cited by examiner

*Primary Examiner* — Kyle Zhai
(74) *Attorney, Agent, or Firm* — Hogan Lovells US LLP

(57) ABSTRACT

Approaches enable images submitted by users, owner, and/or authorized person of a point of interest (e.g., a place, a scene, an object, etc.) to be used as a fiducial to assist recognition and tracking of the point of interest in an augmented reality environment. Multiple images (e.g., crowd-sourced images) of a point of interest taken from different points of view can be dynamically used. For example, as a user with a user device moves through a point of interest, a different image can be chosen from a set of stored candidate images of the point of interest based at least upon GPS locations, IMU orientations, or compass data of the user device. In this way, instead of relying on artificial fiducial images for various detection and tracking approaches, approaches enable images submitted by users and/or an owner or other authorized person of a point of interest to be used as fiducials to assist recognition and tracking of the point of interest.

18 Claims, 12 Drawing Sheets

ADAPTIVE FIDUCIALS FOR IMAGE MATCH RECOGNITION AND TRACKING

BACKGROUND

As personal electronic devices become increasingly sophisticated, people are using such devices in new and interesting ways. For example, personal or portable electronic devices, such as smart phones, tablets, portable media players, and e-book readers, can be used to "augment reality." That is, an electronic device can be used as a viewfinder into the real world and virtual elements can be overlaid to create a reality that is enhanced or augmented. For example, an electronic device can be used to obtain a view of an object or location, and a computer-assisted contextual layer can be displayed on top of the view to provide information about the object or location. Conventional systems and techniques, however, may not offer a dynamic or engaging user experience. Other conventional approaches may provide interfaces that are less than optimal for users. As an example, considerable network bandwidth may be used in the presentation of overlaid virtual elements in conventional systems. As another example, conventional interfaces may limit rendering of virtual elements to a small portion of a display or limit rendering to certain types of elements (e.g., text or primitive shapes).

BRIEF DESCRIPTION OF THE DRAWINGS

Various embodiments in accordance with the present disclosure will be described with reference to the drawings, in which.

DETAILED DESCRIPTION

Figure 1A:
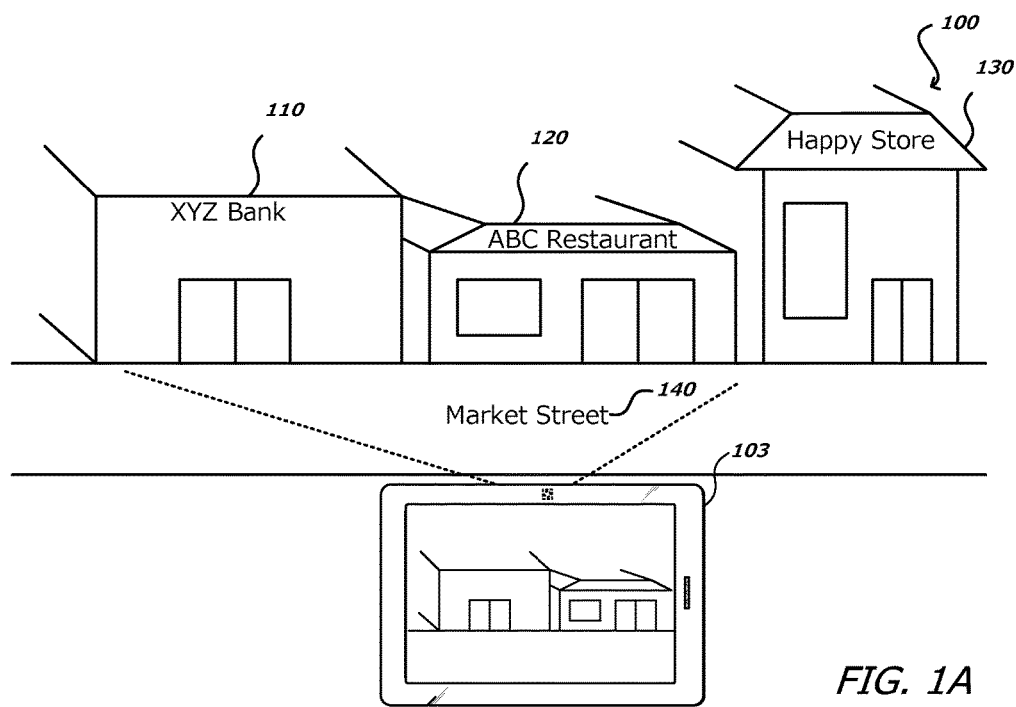
FIG. 1A illustrates an example situation of an environment that can be utilized in accordance with various embodiments.

Systems and methods in accordance with various embodiments of the present disclosure may overcome one or more of the foregoing or other deficiencies experienced in conventional approaches for incorporating information within a live camera view displayed on a display screen of a computing device. In particular, various embodiments enable images received from users, an authorized person of a point of interest (e.g., a place, a scene, an object, etc.), or some other source at an augmented reality system to be used as fiducials to assist recognition and tracking of the point of interest in an augmented reality environment.

In various embodiments, multiple images (e.g., crowd-sourced images) of a point of interest taken from different points of view can be dynamically used. For example, as a user with a user device moves through a point of interest, a different image can be chosen from a set of stored candidate images of the point of interest based at least upon global positioning system (GPS) locations, inertial measurement unit (IMU) orientations, compass data, etc., of the user device. In this way, instead of relying on artificial fiducial images (e.g., barcodes and other scan codes) for various detection and tracking approaches, techniques enable images submitted by users, an owner, and/or other authorized person of a point of interest (e.g., a place, a scene, an object, etc.) to be used as fiducials to assist recognition and tracking of the point of interest. Advantageously, by combining at least GPS location, IMU orientation, compass and image match technology, the adaptive fiducial approach allows for high quality recognition and responsive image tracking on a user's device, with efficient use of network bandwidth.

In certain embodiments, users and business owners of the system can associate content to visual elements representative of the fiducial. As a user's device detects the fiducial, the device can cause the content associated with the fiducial to be presented on the device, where the content can include, for example, various types of information such as promotional coupons, menus, advertisements, reservation systems, floor plans, videos, audio, wait time, customer reviews, music, chat walls, attractions of the place, instant or daily specials, recommendations on specific items, hyperlinks to reviews of the place on third party review sites, or other alternative places, etc. In some embodiments, content can be associated with specific objects or fiducials based at least in part upon one of Global Positioning System (GPS) locations, Inertial Measurement Unit (IMU) orientations, compass data, or one or more visual matching algorithms. Once the content is associated with the fiducial, the fiducial can be discovered by a user with a portable device pointing at the fiducial in the real world. At least some embodiments cause content associated with the fiducial to be presented on a user's device based at least upon one of the proximity of the user to the fiducial, a point of view of the user, a user profile of the user (e.g., user demographic and preferences), or a profile of an owner of the physical location.

Various other functions and advantages are described and suggested below as may be provided in accordance with the various embodiments.

FIG. 1A illustrates an example environment 100 that can be utilized in accordance with various embodiments. Augmented reality (AR) may refer to a type of virtual reality that aims to duplicate the world's environment in a computing device. In this example, an AR system generates a composite view that is a combination of a real scene viewed by a user and a virtual scene generated by the computing device that augments the scene with additional information (e.g., virtual objects, text information, graphical information, etc.). The virtual scene generated by the computing device may be designed to enhance the user's sensory perception of the virtual world that the user may be seeing or interacting with. In a conventional AR processing system, there are three main steps (sometimes others) that can be performed: tracking the camera spatial environment, to know where the mobile device is with respect to the scene; mapping the spatial environment, construct a 3D estimation and spatial understanding of the scene; and rendering the virtual content. As an example, a conventional video chat application may include a feature for enabling the user to overlay virtual elements or other content such as funny hats or other headgear, glasses, facial hair, and other embellishments over the image of the user in the video chat. To enable this feature, the acquired image is processed after it has already been presented on screen. The processing can involve detecting and tracking the user's head or face in the acquired image and then drawing the virtual element on screen based on where the user's head or face was previously tracked.

As shown FIG. 1A, a user with a computing device 103 such as a smart phone, an electronic book reader, or tablet computer, can be seen moving down a street, for example, Market Street 140, while attempting to experience an augmented reality by viewing additional content overlaid on a display of captured image data. It should be understood that various other types of computing devices that are capable of determining and processing input can be used in accordance with various embodiments discussed herein. These devices can include, for example, notebook computers, personal data assistants, video gaming consoles or controllers, portable media players, and wearable computers (e.g., smart watches, smart glasses, etc.) among others. The computing device 103 may include one or more image capture elements (not shown), such as one or more cameras or camera sensors, to capture images and/or videos. The image capture elements may include, for example, a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies.

In this example, the user desires to obtain relevant information about the ABC Restaurant 120 using the computing device 103 to determine, for example, whether to cross the Market Street 140 to visit the restaurant. In accordance with an embodiment, the user can direct one or more image capture elements located on the computing device 103 to capture a live view of at least a portion of the ABC Restaurant 120. The ABC Restaurant 120 may be recognized by analyzing and comparing the captured image(s) or feature(s) with stored images related to the place in a database. In accordance with various embodiments, many embodiments provide image processing algorithms and recognition techniques to recognize a point of interest by matching the feature(s) or image of the point of interest against saved images in a database. For example, optical character recognition (OCR) can be used as a primary image analysis technique or to enhance other processes. Features (e.g., shape, size, color and text) of the point of interest can be extracted and matched against points of interest determined in the vicinity of the user's location. In some embodiments, image processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns). It should be noted that various other techniques (e.g., OCR and other text recognition processes) can be used as the primary image analysis technique or to enhance other processes as are known in the art.

Conventional AR systems and techniques, however, may not offer a dynamic or engaging user experience. For example, conventional AR systems employ computer vision techniques to recognize objects/places in the world by matching a portion of the camera image to stored images containing unique content, like store name lettering or an entire storefront. These images with unique content may help with tracking, which can be important when relevant content is overlaid on the real world object in an augmented view. In some situations, artificial images with unique content (e.g. QR codes) can be placed in a scene to aid recognition and tracking, and these are generally referred to as fiducials. However, in some situations artificial fiducials may not be present, making recognition and tracking difficult or impossible. Further, as is often the case with conventional AR systems, it may be difficult to determine content the user may be interested in, and the user is often provided with augmented content they have no interest in.

Figure 1B:
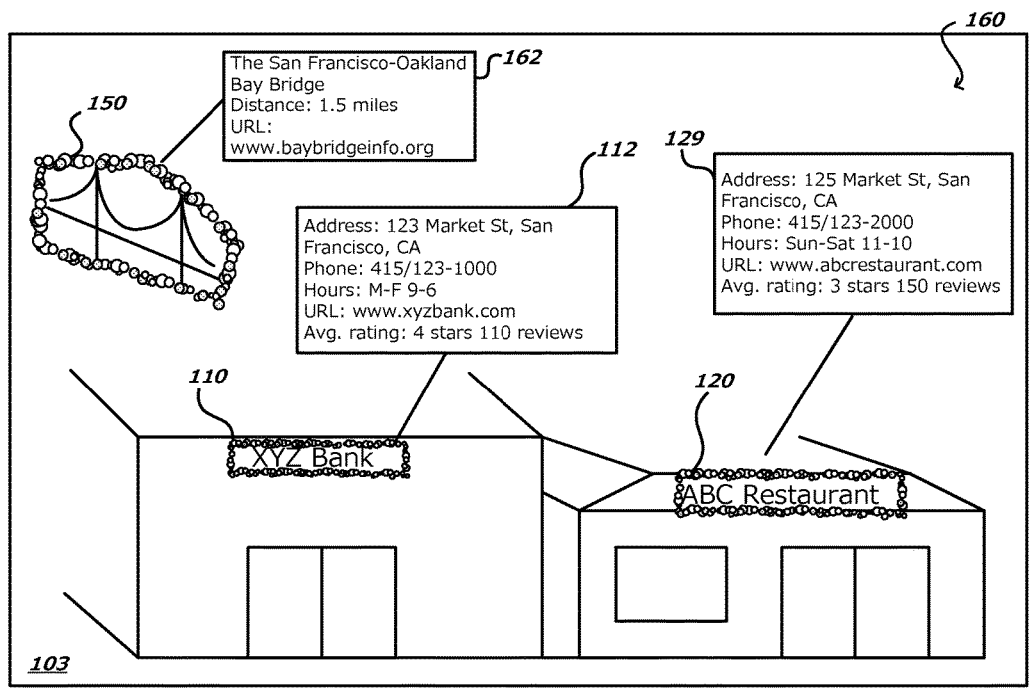
FIG. 1B illustrates an example situation of overlaying virtual elements within a live camera view in accordance with an embodiment.

For example, as shown in FIG. 1B, although the user is interested in content associated with restaurant 120, in this example, XYZ Bank 110, ABC Restaurant 120, and bridge 150 are recognized, and stored content associated with those places are provided based at least upon the captured image data in real time. As shown, the content presented on the user device may include an address, a phone number, business hours, a way to make reservations, and/or customer review of the point of interest. In this example, the content listed in the billboard 112 includes an address, phone number, URL, hours and user review for the XYZ Bank 110, the content listed in the billboard 129 includes an address, phone number, URL, hours and customer rating for the ABC Restaurant 120, and the content 162 associated with the bridge includes a name, URL, and distance to the bridge. In some instances, the content elements in the billboards 112, 129, and 162 can be interactive. For example, the user may select the URL address, www.xyzbank.com, to open a webpage of the XYZ Bank 110, or dial the phone number listed in the content 112 by tapping the number, or select the URL address www.baybridgeinfo.org, to open a webpage of the Bay Bridge. Unfortunately, recognizing and displaying unwanted content can be expensive in terms of resources such as battery life, processing capacity, and network bandwidth.

Accordingly, in accordance with various embodiments, instead of relying on artificial fiducial images and conventional detection and tracking techniques, approaches enable images submitted by users and/or an owner of a point of interest (e.g., a place, a scene, an object, etc.) to be used as fiducials to assist recognition and tracking of the point of interest. The images (e.g., crowd-sourced images) of a point of interest taken from different points of view can be dynamically used. For example, as a user with a user device moves through a point of interest, a different image (i.e., fiducial) can be chosen from a set of stored candidate images of the point of interest based at least upon GPS locations, IMU orientations, or compass data of the user device. Advantageously, by combining at least GPS location, IMU orientation, compass and image match technology, the adaptive fiducial approach allows for high quality recognition and responsive image tracking on a user's device, with efficient use of network bandwidth.

Figure 1C:
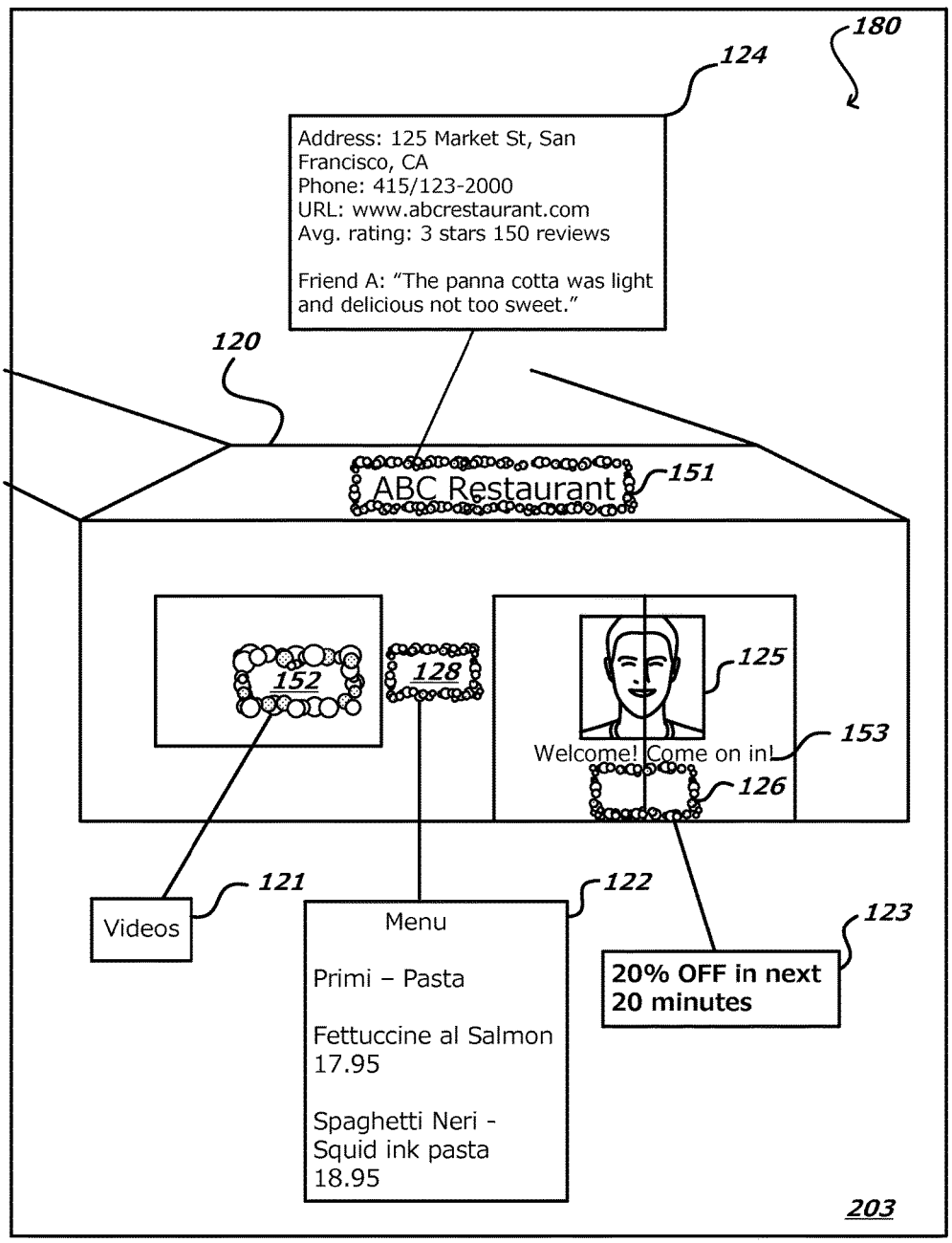
FIG. 1C illustrates an example situation of overlaying virtual elements within a live camera view in accordance with an alternate embodiment.

For example, as shown in example 180 of FIG. 1C, based at least in part on the user's GPS location, IMU orientation, captured image data, and/or compass data, the device determines that the point of interest is restaurant 120. Accordingly, one or more fiducials (artificial and/or crowd-sourced) can be determined and emphasized (e.g., glowing effect, bold effect, billboard effect, or a visual 3D element) and content associated with the fiducials can be overlaid on the image data. The fiducials can be determined from crowd-sourced images and/or images provided by the owner and/or authorized person of the point of interest (e.g., restaurant 120). For example, during the image matching processing there may not be an ideal image to match against due to, for example, varying weather conditions, lighting conditions, image quality, viewpoints, etc. Accordingly, the image data can be compared against at least a subset of the candidate images, and an image from the candidate images that best matches the image data can be selected. The candidate images can be crowd-sourced images captured from different viewing angels, different heights of people, different lighting conditions, different weather conditions, etc. The selected image can be used as a fiducial for image matching and content associated with the fiducial can be overlaid on the image data and displayed on the user's computing device. The fiducial can be tracked along with GPS, IMU, and compass data to determine whether the user has moved or conditions have changed such that a different image is selected and provided as a fiducial to the device.

As shown in the FIG. 1C, the identified fiducials include areas 151, 152, 128, and 126. In this example, the designated area 151 includes the billboard 124 to display an address, phone number, URL, and user reviews (e.g., reviews from Friends A and B) for the ABC Restaurant 120. The designated area 152 includes the billboard 121 of videos. The designated area 128 includes the billboard 122 to display a menu of the ABC Restaurant 120. The designated area 126 includes the billboard 123 to display an instant coupon in bold to draw the user's attention. The canvas or overlay of the ABC Restaurant 120 may also have a picture of the smiling owner 125 inviting the user to visit the Restaurant 120, "Welcome! Come on in!" 153. In some instances, the picture of smiling owner 125 may be a 2D hologram image with the owner facing the direction of a user as the user walks by the front door.

Figure 2A:
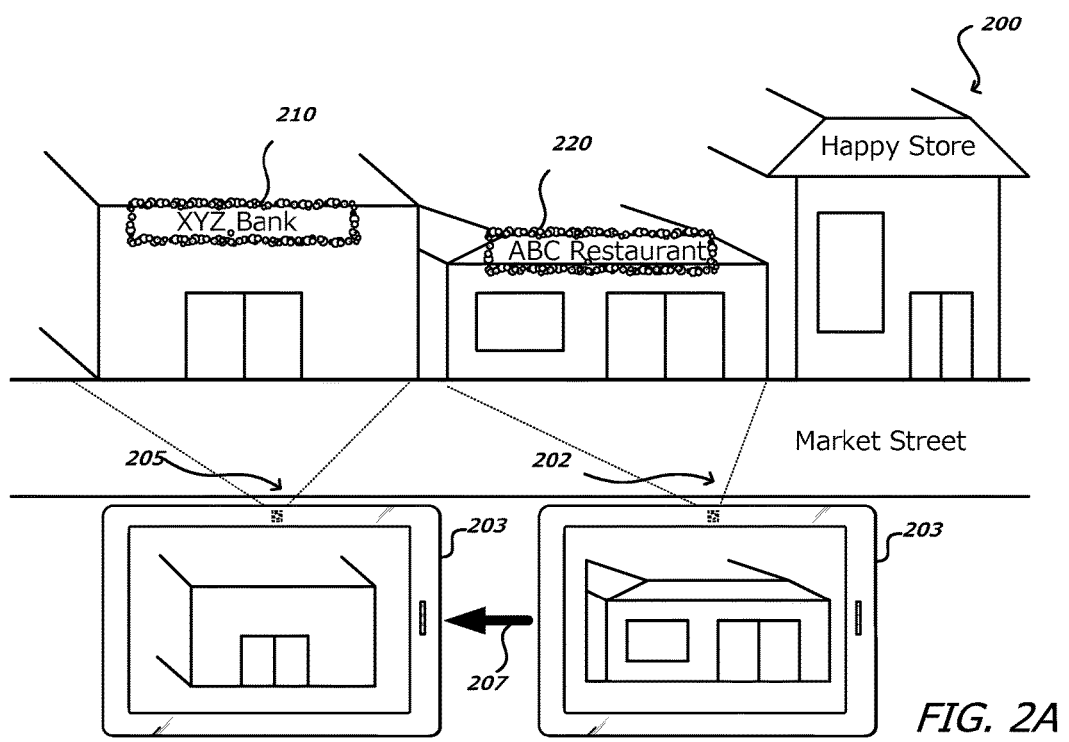
FIGS. 2A and 2B illustrate example situations for recognizing and tracking a point of interest in a live camera view in accordance with an embodiment.
Figure 2B:
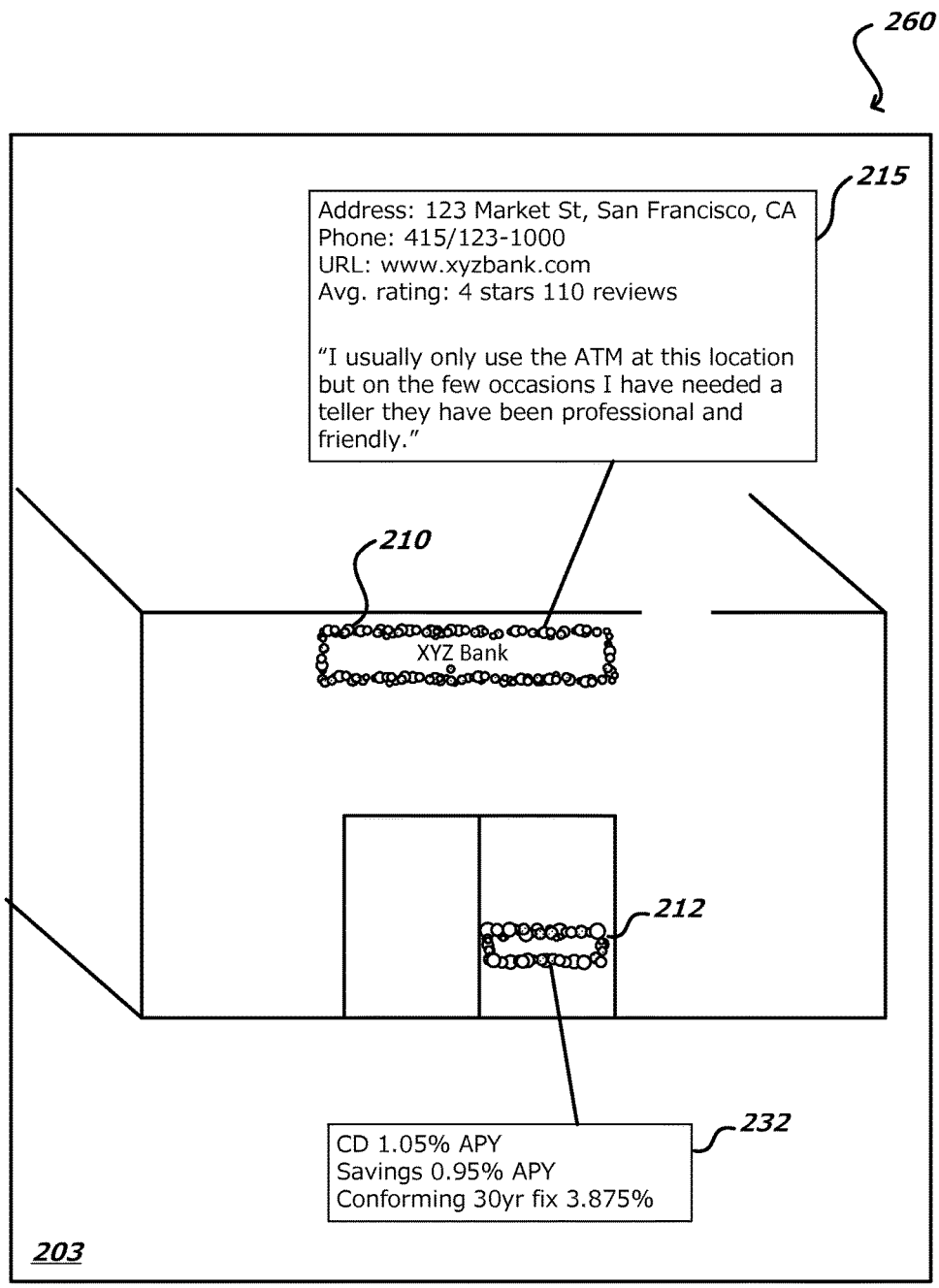

The fiducials can be tracked and as the location of the fiducials with respect to the computing device change more than a threshold distance or some other condition such as lighting, time of day, etc., a different image can be chosen as a fiducial from a set of stored candidate images based at least upon GPS locations, IMU orientations, or compass data of the user device. For example, FIGS. 2A and 2B illustrate example situations for recognizing and tracking a point of interest (a fiducial) in a live camera view in accordance with an embodiment. As shown in example 200 of FIG. 2A, computing device 203 has moved from a first location to a second location as indicated by arrow 207. When in the first location, based at least in part upon GPS locations, IMU orientations, compass data, and image data captured in field of view 202, it can be determined that the point of interest is ABC Restaurant 220. In this situation, images submitted by users and/or an owner of the ABC restaurant can be used to assist recognition and tracking of the point of interest or fiducials included in the point of interest. As described, users and business owners can associate content to visual elements representative of the fiducial. As a user's device detects the fiducial, the device can cause the content associated with the fiducial to be presented on the device. Tracking information can be determined for one or more fiducials, and as a location of the fiducials with respect to the computing device change more than a threshold distance or some other condition such as lighting, time of day, etc. changes more than a threshold amount, a different image can be chosen from a set of stored candidate images based at least upon GPS locations, IMU orientations, or compass data of the user device.

For example, in accordance with various embodiments, when the device is in the second location, based at least in part upon GPS locations, IMU orientations, compass data, and image data captured in field of view 205, the device can determine that the point of interest is XYZ Bank 210. Accordingly, captured image data of XYZ Bank can be captured by a camera of the computing device 203. The image data can be associated with at least one of a current location identifier or a timestamp. The current location identifier can include information associated with, for example, Global Positioning System (GPS) locations, Inertial Measurement Unit (IMU) orientations, compass data of the computing device. The timestamp can include information such as a date and time of capturing the image data.

The information can be provided to a remote server or processed on the computing device. In either situation, information representative of a visual feature associated with XYZ Bank can be determined based at least in part on the image data. This can include, for example, analyzing the image data using one or more image processing algorithms to determine visual features or other unique objects represented in the image. In this situation, the name of the bank, XYZ Bank, is determined. The information (e.g., feature points, feature vectors, or other information characterizing the visual feature) can be matched to stored information based at least in part on the current location identifier, the timestamp, or position information and orientation information associated with the camera at a time of capturing the image data, where the stored information can be associated with at least one candidate image acquired from at least one source. In accordance with various embodiments, matching the information can include determining a plurality of candidate images based at least in part on a location of the user device and position information associated with the computing device; comparing the image data with at least a portion of the plurality of the candidate images using at least one image matching algorithm; determining a confidence score for each compared candidate image of the plurality of candidate images; and selecting a unique image associated with the highest confidence score.

The current location identifier, position information, and orientation information can be determined based at least in part upon one of Global Positioning System (GPS) data, Inertial Measurement Unit (IMU) orientation data, or compass data captured by the computing device, or one or more visual matching algorithms. The stored information can correspond to image data acquired from at least one source, and wherein the at least one source can include information from an augmented reality system, social networking websites, electronic image distribution websites, user provided images, among other sources.

Content associated with the stored information can be retrieved. As described, the content can include, for example, promotional coupons, menus, advertisements, reservation systems, floor plans, videos, audio, wait time, customer reviews, music, chat walls, attractions of the place, instant or daily specials, recommendations on specific items, hyperlinks to reviews of the place on third party review sites, or other alternative places, etc.

In accordance with an embodiment, tracking information associated with a position of a representation of the visual feature with respect to the computing device can be determined. Tracking information can include, for example, to at least one of a position of a representation of the visual feature relative to the computing device, timestamp information that corresponds to one of a time of day and a time of year the image data is captured, or other information capable of being used to determine a change in the fiducial, whether temporal with respect to when the image data was captured, or spatially relative to the computing device. The content can be provided for display with the captured image data on the computing device based at least in part on the position of the visual feature being within a position threshold and the content can be rendered in an overlay element that overlays the captured image data displayed on the computing device.

For example, as shown in example 260 of FIG. 2B, the identified fiducials include areas 210 and 212. In this example, the designated area 210 includes the overlay 215 to display an address, phone number, URL, and user reviews (e.g., reviews) for the XYZ Bank. The designated area 212 includes the overlay 232 information about current interest rates. In accordance with various embodiments, depending on the distance between a user and a point of interest (e.g., the XYZ Bank), different levels of detail information (e.g., content and links) related to the point of interest may be presented to the user. As the user gets closer to the point of interest, certain content (e.g., promotions) may be shown on the user device. In some embodiments, depending on the fiducials that the user device is pointing at, a different set of content may be presented to the user. In some embodiments, based upon a point of view of a user, certain content and links are shown to the user in small fonts or icons. The user may get more details of these fonts or icons by selecting the small fonts or icons, or magnifying a display area corresponding to the small fonts or icons. In certain embodiments, a user can take a self-guided tour of a point of interest in an augmented reality environment by pointing a user device with a camera at the point of interest in the real world and then receiving different links, files and/or content related to the point of interest for each image on the camera view of the user device.

In some embodiments, the information of a point of interest presented to a user can be customized based at least upon the user profile or GPS locations, weather conditions, compass, or a degree of relevancy to the point of interest. The customization of the information may include choosing what types of information being presented and/or how the information is presented on the user device. For example, the information pertinent to a restaurant may include subject matters, such as the type of food served, menu, price, user reviews, professional critic reviews, etc. In some embodiments, information deemed more relevant to the user may be displayed more prominently than those less relevant. If a user desires more information about a point of interest, the user may magnify or zoom the point of interest on a user device.

In various embodiments, content presented on a user device can be determined based at least in part upon a user profile or the location of the user device. For example, if the user is determined to be a first time visitor to a location, for example San Francisco, an icon or symbol of a landmark (e.g., the San Francisco-Oakland Bay Bridge) that is in the direction or in the vicinity of a user device may be presented on the user device, together with an explanatory billboard. The overlay can include tourist information regarding the landmark (e.g., the distance and URL of the Bay Bridge). In some embodiments, points of interest or landmarks in the direction of a user device have to meet a predetermined set of conditions to be presented on a user device. The predetermined set of conditions include such as, but are not limited to, whether the points of interest are within a predetermined number of miles, having a threshold review rating, or within a predetermined degree of orientation of the user device.

Figure 3:
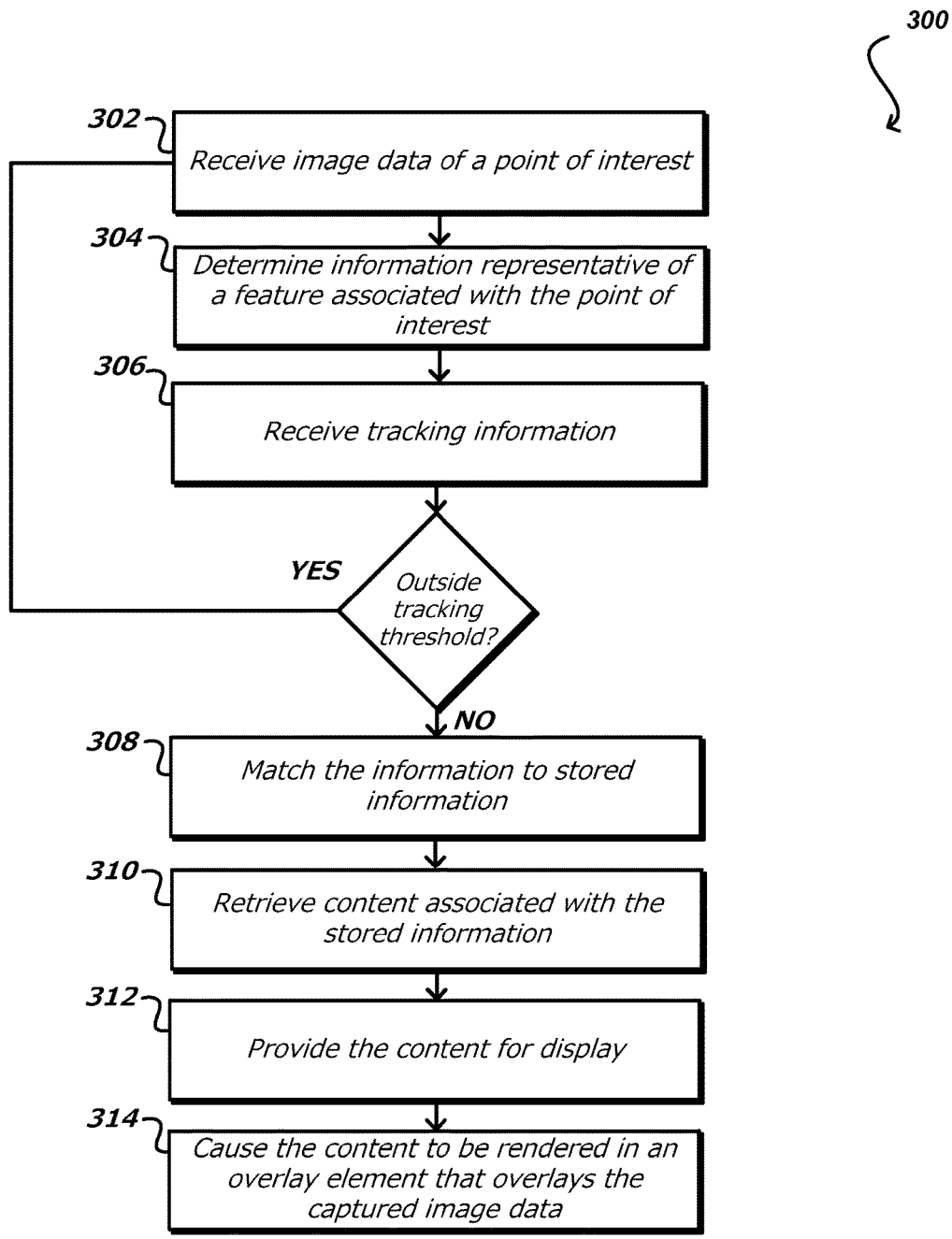
FIG. 3 illustrates an example process for recognizing and tracking a point of interest in a live camera view in accordance with various embodiments.

FIG. 3 illustrates an example process 300 for recognizing and tracking a feature or point of interest in a live camera view in accordance with various embodiments. It should be understood that there can be additional, fewer, or alternative steps performed in similar or alternative orders, or in parallel, within the scope of the various embodiments unless otherwise stated. In the context of augmented reality, an image of an object or point of interest (e.g., person, place, etc.) can be captured in a substantially real-time manner using a camera of a mobile computing device. Using an appropriate application executing on a computing device, a user is able to obtain an image of the point of interest or object by positioning the mobile computing device such that the point of interest or object is within a field of view of at least one camera of the mobile computing device. The image data can be received 302 at a remote server such as a server of an augmented reality system or other processing system. The image data can be associated with at least one of a current location identifier or a timestamp. The current location identifier can include information associated with, for example, Global Positioning System (GPS) locations, Inertial Measurement Unit (IMU) orientations, compass data of the computing device. The timestamp can include information such as a date and time of capturing the image data.

Information representative of a visual feature (e.g., object or other feature) can be determined 302 at the remote server or determined on the computing device and provided to the remote server. In various embodiments, the processes described herein can be performed at the remote server, at the computing device, or a combination of the remote server and computing device. Information representative of a visual feature associated with the point of interest can be determined 304 based at least in part on the image data. This can include, for example, analyzing the image data using one or more image processing algorithms to determine visual features or other unique objects represented in the image.

Tracking information associated with a position of a representation of the visual feature with respect to the computing device can be determined and received 306. Tracking information can include, for example, at least one of a position of a representation of the visual feature relative to the computing device, timestamp information that corresponds to one of a time of day and a time of year the image data is captured, or other information capable of being used to determine a change in the fiducial, whether temporal with respect to when the image data was captured, or spatially relative to the computing device. In the situation where it is determined that the tracking information is outside a tracking threshold, additional image information is captured and received at the remote server or processed on the computing device. For example, in an embodiment, an indication that the position of the visual feature is outside a position threshold of the tracking threshold can be received and the content rendered in the overlay element that overlays the image data displayed on the computing device to be updated. In another example, an indication that the timestamp information is outside a temporal threshold of the tracking threshold can be received and the content rendered in the overlay element that overlays the image data displayed on the computing device to be updated. The indication can be received at a remote server, such as a server associated with an augmented reality system or determined and received at a component on the device. In the situation where it is determined that the tracking information is within a tracking threshold, the information (e.g., feature points, feature vectors, or other information characterizing the visual feature) can be matched 308 to stored information based at least in part on the current location identifier, the timestamp, or position information and orientation information associated with the camera at a time of capturing the image data, wherein the stored information can be associated with at least one candidate image acquired from at least one source. In accordance with various embodiments, matching the information can include determining a plurality of candidate images based at least in part on a location of the user device and position information associated with the computing device; comparing the image data with at least a portion of the plurality of the candidate images using at least one image matching algorithm; determining a confidence score for each compared candidate image of the plurality of candidate images; and selecting a unique image associated with the highest confidence score. In accordance with various embodiments, the current location identifier, position information, and orientation information can be determined based at least in part upon one of Global Positioning System (GPS) data, Inertial Measurement Unit (IMU) orientation data, or compass data captured by the computing device, or one or more visual matching algorithms. The stored information can correspond to image data acquired from at least one source, and wherein the at least one source can include information from an augmented reality system, social networking websites, electronic image distribution websites, user provided images, among other sources.

Content associated with the stored information can be retrieved 310. As described, the content can include, for example, promotional coupons, menus, advertisements, reservation systems, floor plans, videos, audio, wait time, customer reviews, music, chat walls, attractions of the place, instant or daily specials, recommendations on specific items, hyperlinks to reviews of the place on third party review sites, or other alternative places, etc. The content can be provided 312 for display with the captured image data on the computing device and the content can be caused 314 to be rendered in an overlay element that overlays the captured image data displayed on the computing device. In accordance with various embodiments, when rendering the content (or at other times) directional cues may be provided on a user interface layer of the user device that indicate points of interests that are being displayed on the computing device, i.e., not being captured by the cameras of the computing device or in the point of view of the user, but are nearby and relevant. For example, a directional cue may indicate that a store or other point of interest can be discovered if the user points the device in the direction of the directional cue.

In certain embodiments, the overlaid image content can be controlled to provide a viewer with "hidden" or additional content that is based at least in part upon a current relative position and/or orientation of the viewer with respect to the device, as well as changes in that relative position and/or orientation. The content can include various portions, and different adjustments can be applied to each portion based upon these and/or other such changes. These adjustments can include, for example, displaying different information and/or sounds and various other content. For example, as the user tilts, or rotates, or otherwise changes the orientation of the device, the user can "peek" at different information associated with what's in the field of view of the camera. In one example, in the situation where the user is being provided augmented reality content associated with a restaurant, the user can tilt or rotate the device about a primary axis to cause the device to display, for example, a restaurant rating, hours of operation, best dishes, etc., which when added to the rendered content, can enhance the experience of the viewer.

In accordance with various embodiments, the relative movements can be based upon factors such as the distance of the viewer to the device, a direction of movement of the user, a direction of change in orientation of the device, or other such factors. In various embodiments, the relative position and/or orientation of a viewer of a computing device can be determined using at least one image capture element of the device. For example, the feed from a video camera can be analyzed to locate a relative position of the viewer in the video feed, which can be analyzed to determine the relative direction of the viewer. In other embodiments, one or more digital still cameras can capture images periodically, in response to detected movement of the viewer and/or device, or at other appropriate times, which then can be analyzed to attempt to determine viewer position, as distance can often be determined in addition to direction when analyzing multiple sources of information from different locations. Distance can be determined, for example, using stereoscopic imaging or proximity sensing, among other such options. In some embodiments, infrared (IR) imaging can be used to detect specific features of the viewer, such as the viewer's eyes, for use in determining and/or tracking the location of the viewer. In still other embodiments, changes in the orientation and/or position of the device can be determined using at least one motion sensor of the device, in order to provide for a higher sampling frequency than might otherwise be possible using the image information captured by the camera, or otherwise attempt to improve the relative position determinations. In some situations, a sensor that is remote, separate, or otherwise in communication with the device can be used to detect a change in orientation and/or position of the device. The orientation information can be received at the device from the sensor, and the device can cause the image data to be duplicated on particular pixels based at least in part on the received orientation and/or position information.

In at least some embodiments, a computing device can attempt to determine changes in the relative position, direction, and/or orientation between the viewer and device in order to update the perspective from which the displayed content is rendered or otherwise displayed. For example, the device can continue capturing and analyzing image information to attempt to determine changes in relative position of the viewer, such as may be based on movement of the viewer and/or the device. The device also can utilize information from at least one orientation or position determining element of the device, such as an accelerometer or inertial sensor, to assist in detecting motions of the device and updating the viewing angle accordingly. These elements also can detect changes in orientation of the device, such as through rotation of the device, even though the relative position between the viewer and the device might not have substantially changed. The display can be updated based at least in part upon changes in orientation as well. By adjusting the content to correspond to changes in the relative viewing angle of the user, the user can view additional and/or different content associated with what is in the field of view of the camera.

Figure 4A:
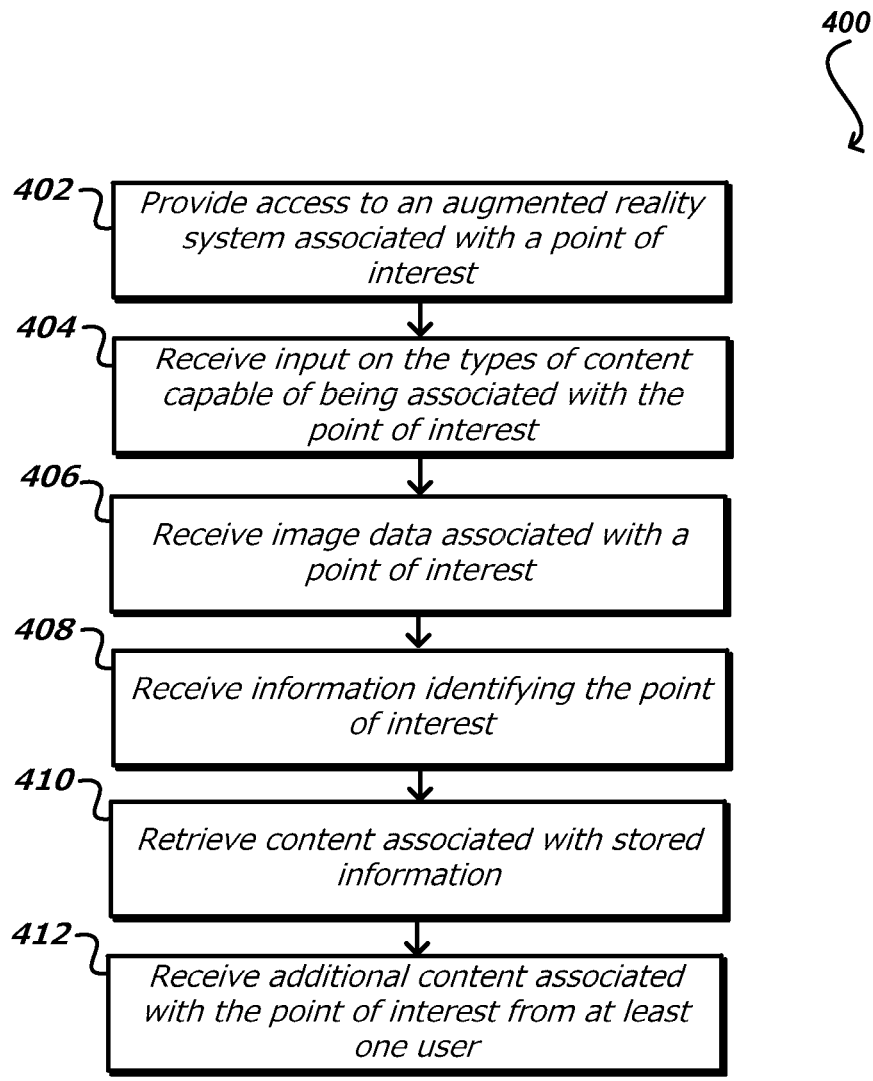
FIGS. 4A and 4B illustrate example processes for providing content to be associated with points of interest in accordance with various embodiments.

FIG. 4A illustrates an example process 400 for providing content to be associated with features or points of interest in accordance with various embodiments. In this example, content can be provided by an owner or authorized person of the point of interest or one or more users. In this example, the authorized person is provided 402 access to an augmented reality system. For example, using one of a number of authentication processes, an owner or other authorized person of a point of interest can enter credentials to obtain access to an augmented reality system associated with the point of interest. Upon authentication, the authorized person can provide input received 404 at the system on the types of content capable of being associated with the point of interest, and/or how the associated content is to be presented (e.g., a blank wall or whole business-front, layout, or visual elements to be attached) and this input can be received at the system. The types of content can include text, images, video, sound, etc. In some situations the authorized person can limit the types of content while in some situations there is no limit to the type of content that can be associated with the points of interest. In certain situations, there is no owner or authorized person; rather, any user can indicate a point of interest. For example, a user of the system may indicate a wall, area, location, or other physical area as a point of interest. In such a situation, default limitations can be used as to the type of content that can be associated with the point of interest.

As described images can be received at the system by users of the system. For example, image data (e.g., an image or video) can be captured of a point of interest in the real world by a user device and received 406 at a remote server such as a server of an augmented reality system or other processing system. The image data can correspond to a point of view from a user of the user device. The point of view of the user can be determined based at least in part upon one of GPS locations, IMU orientations, or compass data of the user device. The image data may have one or more features (e.g., visual features) for image matching and recognition. In some embodiments, the features may be used as one or more anchor points in an augmented reality environment for users to associate content with the point of interest. As part of receiving the image data, an indication may be provided to the user or owner about the quality of the captured image so that suitable images can be submitted for image matching. For example, an image with unique visual features works better in image matching than the one that is featureless. In some instances, the scaled indication (e.g., a scale of 0 to 10, or strong/medium/bad) can be provided to the user. Unless the quality of an image crosses a minimum threshold, the image is not allowed to be submitted.

Further, as part of receiving the image data, information identifying the point of interest (POI) can be received 408 at the system. The information can be received by the user or owner, by matching one or more features of the point of interest against at least a portion of saved images of a plurality of points of interest in a database, or by GPS, IMU and compass comparisons against an existing database of points of interest. In the situation where the user or owner provides the information, the user or owner can outline or otherwise indicate the point of interest by, for example, tapping and dragging their finger or an object to outline the point of interest displayed on the display screen of the device. Information indicative of the outline, e.g., location, placement, etc., can be provided to the system.

In some embodiments, the plurality of images used in the image recognition and matching process can be selected based at least in part upon the proximity of the points of interest to the location of the user device or the point of view of the user. In accordance with various embodiments, content, files, and/or links related to the point of interest can be received 410 at the database. For example, in some embodiments, the content, files, and/or links can be retrieved directly from various types of sources, such as, social networking sites, newspapers and magazines, search engines, local directory services, and/or third party service providers. The system, owner, or user of the system can initiate a process to acquire such content. The content, files, and/or links can be subject matter of the point of interest such as, attractions of the point of interest, instant or daily specials, recommendations on specific items, hyperlinks to reviews of the point of interest on third party review sites, or other alternative point of interest (e.g., proximity, or reviews) based on user's profile and preferences. Additional links, content, and/or files can be received 412 by at least one user through the interface layer and/or edits can be made and received on any part of the links, content, and/or files that were submitted by the user. Thereafter, the additional content and/or edited content files, and/or links can be presented on an interface layer of the user device. A preview of the retrieved content, files, and/or links can be presented on an interface layer of the user device based at least in part upon the user's proximity to the point of interest, the point of view of the user, the user's profile and preferences, or some other reason.

Figure 4B:
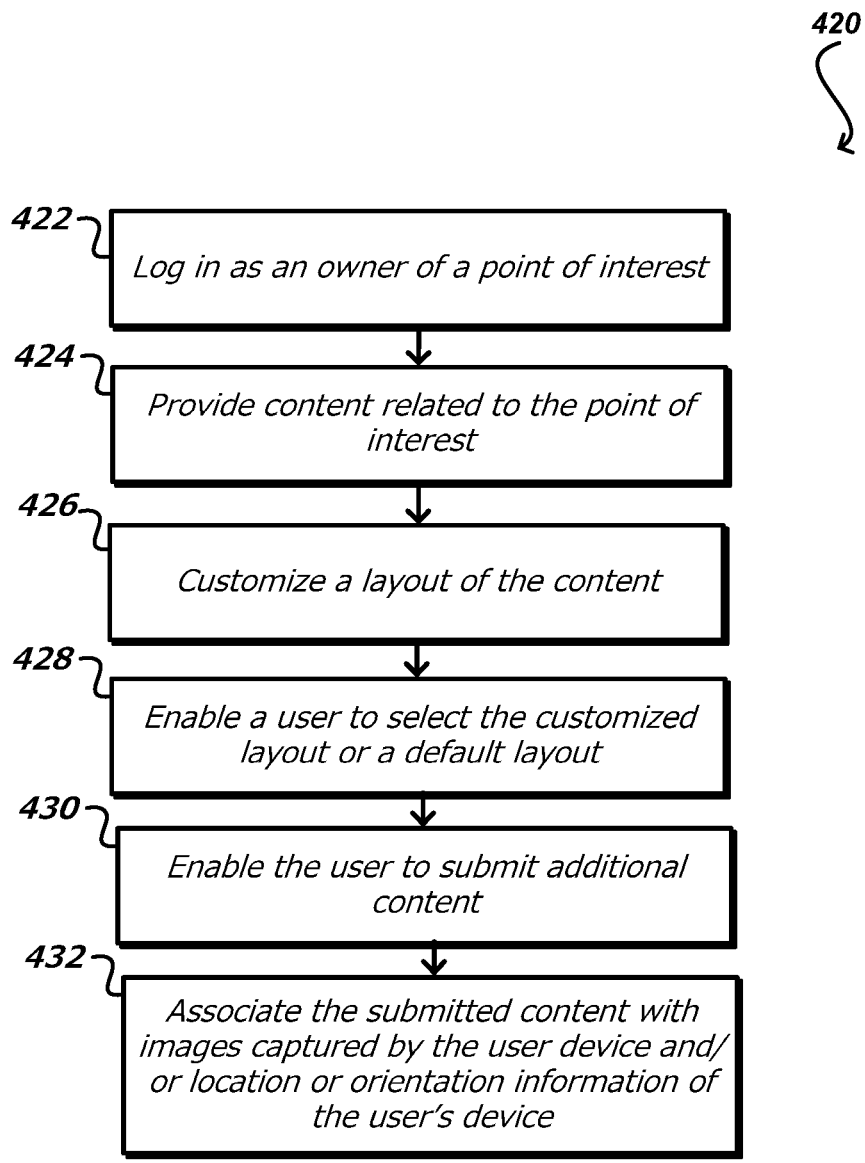

FIG. 4B illustrates an example process 420 for specifying the display of content on a computing device. In this example, an owner or other authorized person of a point of interest or features associated with the point of interest can specify how virtual content is displayed when a user attempts to view the virtual content overlaid on a live camera view. The example process begins with logging 422 in as an owner of a point of interest through an authentication process. The owner may have to answer correctly a series of questions relating to the history of the point of interest or information listed in an owner record for the point of interest. Once the owner gets authenticated, the owner can provide 424 content or a link relating to the point of interest in an augmented reality environment. The owner can customize 426 a layout of the content or link on a user interface layer corresponding to the point of interest. A user can select 428 the customized layout, a default layout, or create a customized layout of the content or link on the user interface layer corresponding to the point of interest on a user device. In certain embodiments, the user can submit 430 one or more links and/or content relating to the point of interest on the user interface layer, or edit any of the content and/or link that were submitted by the user. The submitted link(s) and/or content can be associated 432 with at least one of one or more acquired images by the user device, or GPS location, IMU orientations, or compass data of the user device. In some embodiments, an owner of a point of interest can control at least in part how the content or links can be presented (e.g., a canvas or overlay, a layout of markers, or how many links attached to each marker) to users in an augmented reality environment, or what types of content and link can be attached to the point of interest.

Figure 5:
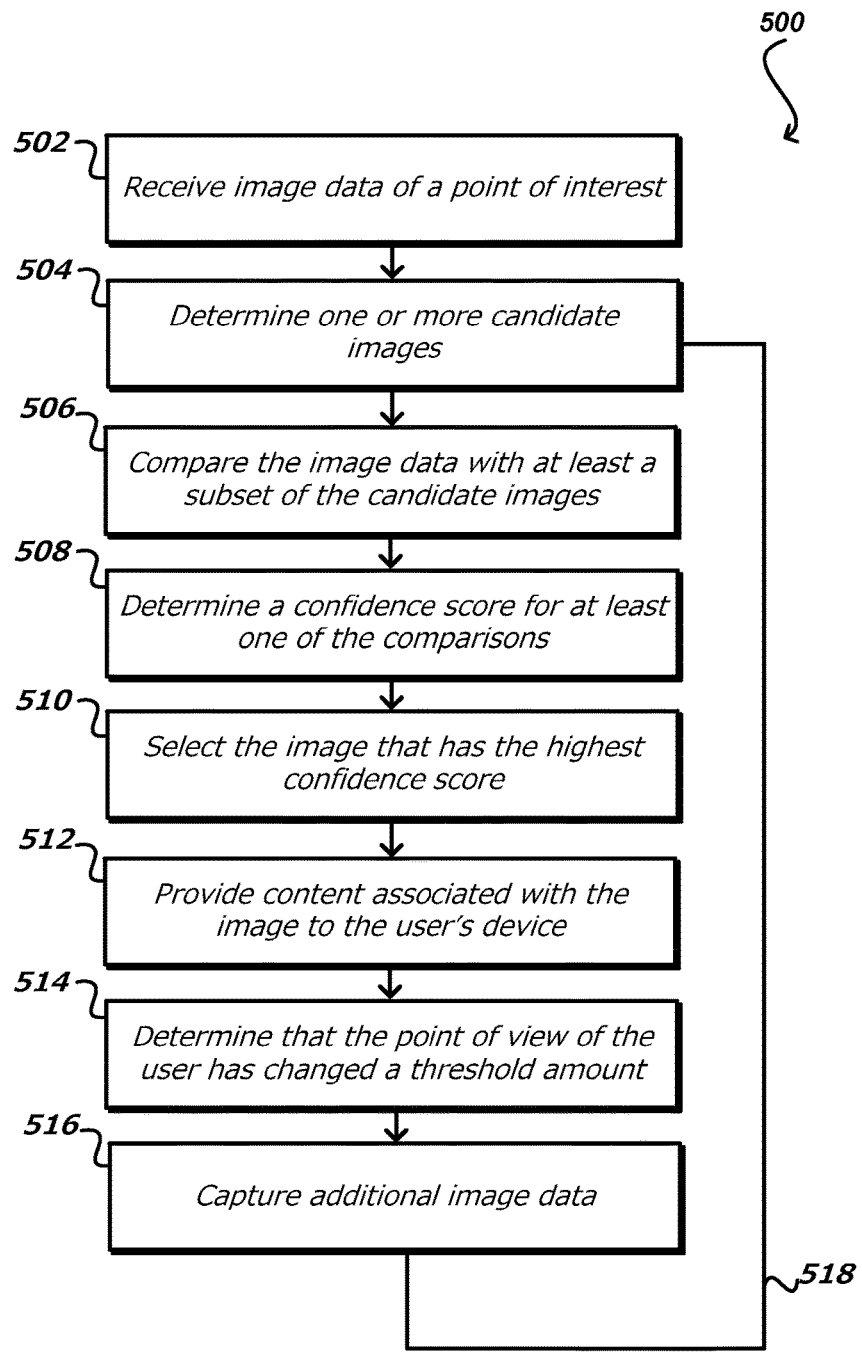
FIG. 5 illustrates an example process for determining image data representative of a point of interest that can be utilized in accordance with various embodiments.

FIG. 5 illustrates an example process 500 for determining image data representative of a point of interest or feature associated with the point of interest that can be utilized in accordance with various embodiments. Image data of a point of interest is received 502 from a user device. The image data corresponds to a point of view from a user of the user device and may have one or more features for image matching and recognition. The point of view of the user can be determined based at least in part upon GPS locations, IMU orientations, or compass data of the user device. One or more candidate images can be determined 504 based at least upon the location of the user device, or the point of view of the user. The received image data can be compared 506 with at least a subset of the candidate images using one or more image matching algorithms. As described, the candidate images may be taken at different times of day and/or under different weather conditions. A confidence score is determined 508 for at least one of the comparisons. In various embodiments, a confidence sore is determined for each comparison and an image with the highest confidence score is selected 510. Content associated with the image can be provided 512 to the user's device. In response to determining 514 that the point of view of the users has changed a threshold amount, new image data can be captured 516 utilized 518 by the user device for fiducial recognition and tracking as described above. In some embodiments, the new image data might have the same or different content as the previous unique image. A new image data with the same content might represent a different point of view of the same point of interest. The new image data is selected from a new set of candidate images that corresponds to the location of the user device, and the new point of view of the user. New content associated with the new image data can be presented on the user interface of the user device.

Figure 6:
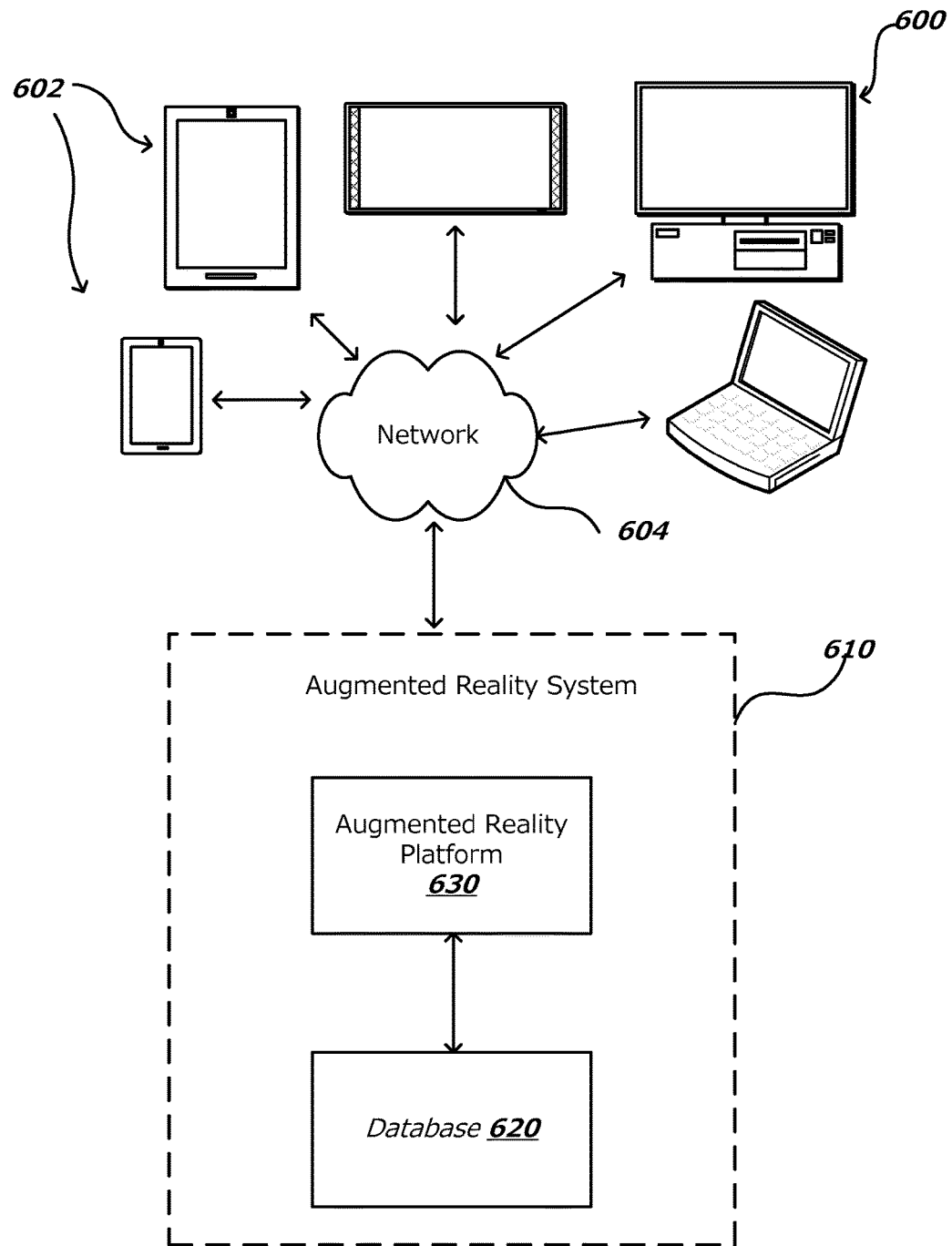
FIG. 6 illustrates an example of an augmented reality system for recognizing and tracking a point of interest in accordance with various embodiments.

FIG. 6 illustrates an example of an augmented reality system for recognizing and tracking fiducials (e.g., artificial and/or crowd-sourced) in accordance with various embodiments. The augmented reality platform 630 communicates with the client computing devices 602 via the network 604. Although only some client computing devices 602 are shown in FIG. 6, it should be understood that various other types of electronic or computing devices that are capable of receiving, or rendering a web application in accordance with various embodiments are discussed herein. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these.

In some embodiments, the augmented reality platform 630 provides a web service allowing users to search and discover links and other content (e.g., reviews, menus, video, chat walls, contact information, URLs) that are tied to unique visual features at a point of interest in the real world. The client computing devices 602 can display those links and content as augmented reality content on the display screen or the camera preview screen. On the production side, the augmented reality system 630 enables users or an owner of point of interest to submit or upload links and/or contents related to the point of interest to the database 620. The links and/or contents are tied to at least one of the point of view (e.g., GPS location, IMU orientation, and compass) from the client computing device 602, or image features of the point of interest. On the consumption side, users in the real world can discover the links and/or content related to the point of interest by pointing the client computing device 602 at the point of interest. The links and/or content related to the point of interest can be presented as content augmenting a camera preview of the real world.

In some embodiments, the augmented reality platform 630 enables users to submit multiple and varied points of view of the same point of interest. In some instances, submitted points of view are taken under different weather conditions. As a user moves along in the real world, the augmented reality system 630 can recognize and match features in the real-time image against images that are associated to the points of interest in the vicinity of the client computing device 602 or within the point of view of the user. Candidate images together with associated content and/or links can be dynamically selected, even when points of view of the user is moving and the real-time image is different from the saved images. The augmented reality platform 630 can calculate a confidence score for each candidate image by matching the candidate image against the real-time image and provide a stored image with the highest confidence score for the user to use as a fiducial for recognition and tracking, along with the content and/links associated with the point of interest.

For example, in accordance with various embodiments, image data of a point of interest captured by a camera of a computing device operated by a user can be received at the augmented reality platform, where the image data can include at least one visual feature. Information representative of the visual feature can be determined based at least in part on the image data. Tracking information associated with the visual feature can be received. In response to determining that the tracking information is within a tracking threshold, the information can be matched to stored information based at least in part on position information and orientation information associated with the camera at a time of capturing the image data, wherein the stored information corresponding to a one or more items used to determine an item matching to the visual feature. Content associated with the item matched to the visual feature can be retrieved and provided for display with the image data on the computing device. Thereafter, the content can be caused to be rendered in an overlay element that overlays the image data displayed on the computing device. The content can include, for example, user-selectable elements or other visual content elements that can be selected by the user or otherwise viewed, the content elements including at least one of a button or a hyperlink, for example. In accordance with an embodiment, the overlay element can augment the image data by overlaying the content, wherein the overlay element is selected from one of a box, a button, a three-dimensional (3D) structure, an animation, audio, video, Web page, or interactive user interface.

Figures 7A, 7B:
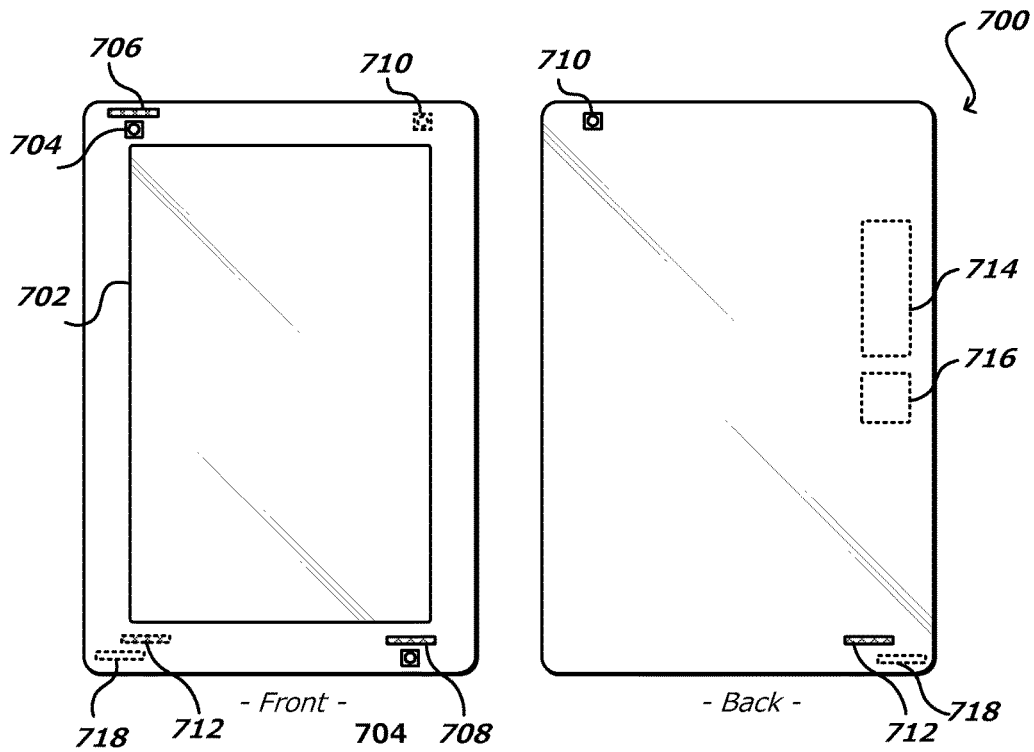
FIGS. 7A and 7B illustrate an example computing device that can be used in accordance with various embodiments.

FIGS. 7A and 7B illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, or electronic gyroscopes operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

The example device also includes at least one computing mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
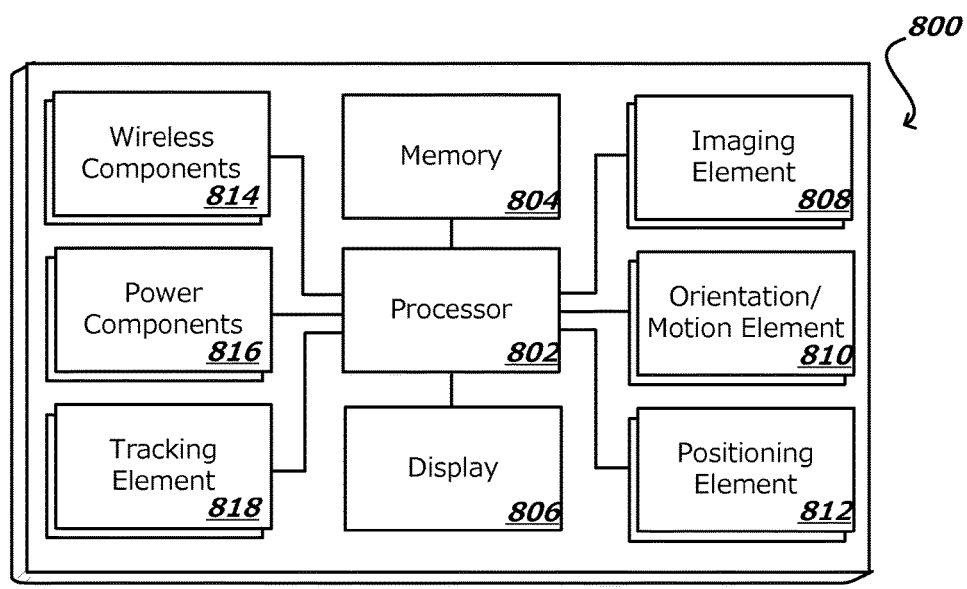
FIG. 8 illustrates an example set of basic components of a computing device, such as the device described with respect to FIGS. 7A and 7B.

FIG. 8 illustrates a set of basic components of an electronic computing device 800 such as the device 700 described with respect to FIGS. 7A and 7B. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of computing approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The example device also includes a tracking element 818 operable performing functions such as receiving image data of a point of interest captured by a camera of a computing device operated by a user, the image data including a visual feature; determining information representative of the visual feature based at least in part on the image data; receiving tracking information associated with the visual feature; determine that the tracking information is within a tracking threshold; matching the information to stored information based at least in part on position information and orientation information associated with the camera at a time of capturing the image data, the stored information corresponding to a one or more items used to determine an item matching to the visual feature; retrieving content associated with the item matched to the visual feature; providing the content for display with the image data on the computing device; and cause the content to be rendered in an overlay element that overlays the image data displayed on the computing device.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 9:
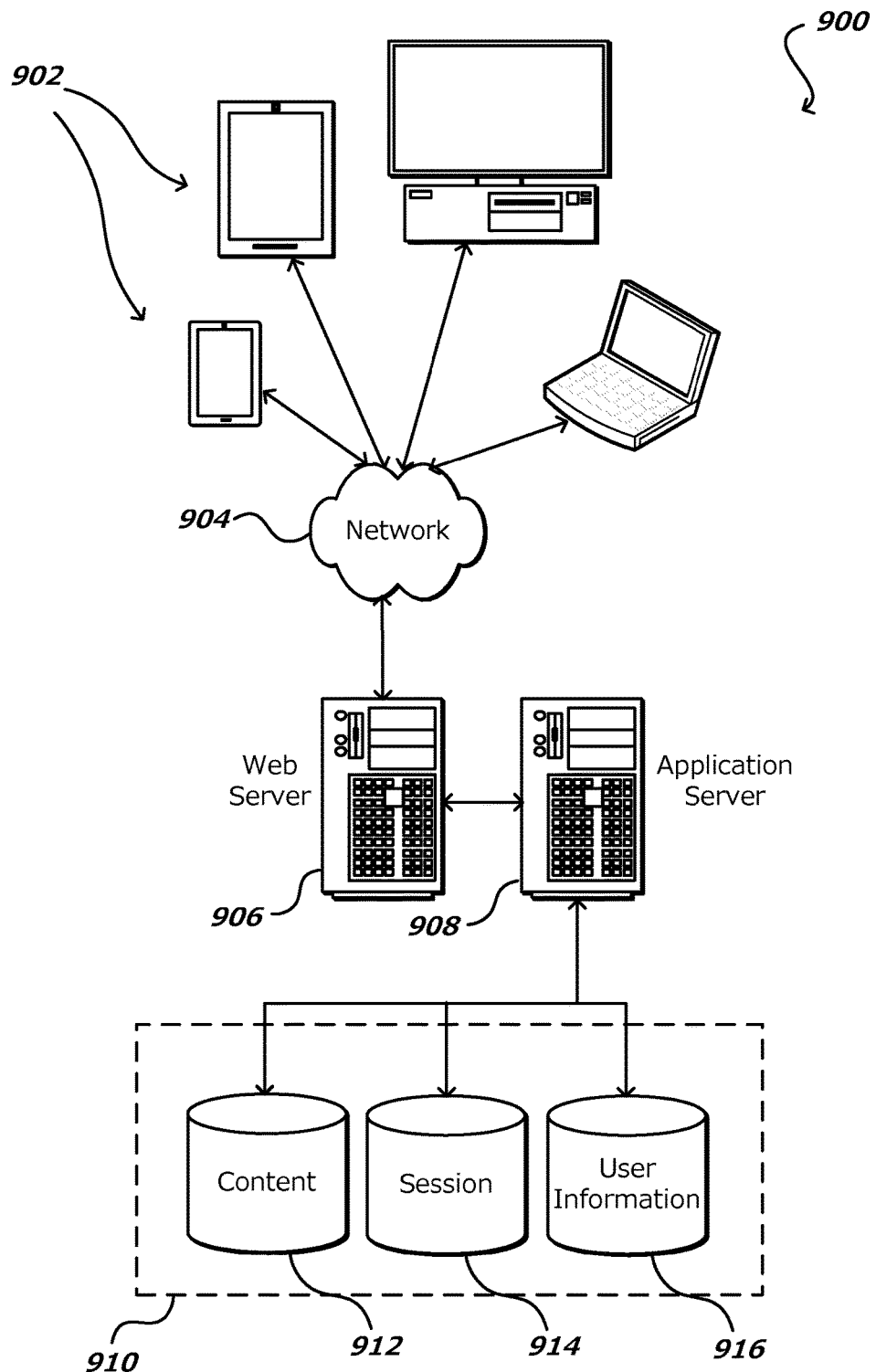
FIG. 9 illustrates an environment in which various embodiments can be implemented in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
    a processor;
    memory including instructions that, when executed by the processor, cause the computing system to:
        receive image data of a point of interest captured by a camera of a computing device, the point of interest associated with an external content provider storing and maintaining information associated with the image data;
        receive device data associated with at least one of a current location identifier representing position coordinates of where the image data was captured, a timestamp representing a time of capturing the image data, or orientation information representing an orientation of the computing device at the time of capturing the image data;
        analyze the image data using at least one image processing technique to determine a visual feature that represents a visual aspect of the point of interest;
        receive tracking information corresponding to a position of a representation of the visual feature with respect to the computing device;
        determine whether the position of the visual feature is within a position threshold;
        match, in response to the visual feature being within the position threshold, the image data to stored information maintained by an application provider, the image data based on the visual feature and at least one of the current location identifier, the timestamp, or the orientation information, the stored information being associated with at least one candidate image associated with the external content provider, the application provider and the external content provider being separate entities;
        determine an additional set of candidate images based at least in part on one of an updated location identifier, updated orientation of the computing device, or timestamp associated with the additional set of candidate images;
        compare the image data with at least a subset of the additional set of candidate images;
        determine a confidence score for each of the subset of the additional set of candidate images;
        select an image from the subset of the additional set of candidate images that has the highest confidence score;
        retrieve content associated with the stored information of the image selected from the subset of the additional set of candidate images that has the highest confidence score, the content including content elements selectable by a user of the computing device, the content provided by the external content provider;
        provide the content for display with the image data on the computing device;
        cause the content to be rendered in an overlay element that overlays the image data displayed on the computing device; and
        in response to determining that the position of the representation of the visual feature is outside the position threshold, receive updated image data to determine updated content associated with the visual feature, wherein the updated content includes a new type of content, wherein the user is able to interact with the updated content displayed in the overlay element by accessing the content elements selectable by the user.

2. The computing system of claim 1, wherein the instructions when executed to match the image data to stored information, further cause the computing system to:
    determine a set of candidate images based at least in part on the current location identifier, the timestamp, and the orientation;
    compare the image data with at least a portion of the set of candidate images using at least one image matching algorithm;
    determine a confidence score for each compared candidate image of the set of candidate images; and
    select an image from the set of candidate images associated with the highest confidence score.

3. A computer-implemented method, comprising:
    receiving image data of a point of interest captured by a camera of a computing device, the point of interest associated with an external content provider storing and maintaining information associated with the image data;
    receiving device data, the device data including position information and orientation information of the computing device at a time of capturing the image data;
    analyzing the image data using at least one image processing technique to determine a visual feature that represents a visual aspect of the point of interest;
    receiving tracking information associated with the visual feature;
    determining whether the tracking information is within a tracking threshold;
    matching, in response to the visual feature being within the tracking threshold, the image data to stored information maintained by an application provider, the image data based on the visual feature, the position information, and the orientation information, the stored information corresponding to one or more items used to determine an item matching to the visual feature, the items associated with the external content provider, the application provider and the external content provider being separate entities;
    determining a set of candidate images based at least in part on one of an updated location identifier, updated orientation of the computing device, or timestamp associated with the set of candidate images;
    comparing the image data with at least a subset of the set of candidate images;
    determining a confidence score for each of the subset of the set of candidate images;

selecting an image from the subset of the set of candidate images that has the highest confidence score;

retrieving content associated with the item matched to the visual feature of the image selected from the subset of the set of candidate images that has the highest confidence score, the content provided by the external content provider;

providing the content for display with the image data on the computing device; and causing the content to be rendered in an overlay element that overlays the image data displayed on the computing device; and in response to determining that the tracking information associated with the visual feature is outside the tracking threshold, receiving updated image data to determine updated content associated with the visual feature, wherein the updated content includes a new type of content.

4. The computer-implemented method of claim 3, wherein the content includes at least one of promotional coupons, menus, advertisements, reservation systems, floor plans, videos, customer reviews, music, chat walls, audio, wait time, attractions of the point of interest, instant or daily specials, recommendations on specific items, hyperlinks to reviews of the point of interest on third party review sites, or alternative points of interest.

5. The computer-implemented method of claim 3, further comprising:
determining the position information and the orientation information based at least in part upon one of Global Positioning System (GPS) data, Inertial Measurement Unit (IMU) orientation data, compass data captured by the computing device, or one or more visual matching algorithms.

6. The computer-implemented method of claim 3, wherein the stored information corresponds to image data acquired from at least one source, and wherein the at least one source includes an augmented reality system, social networking websites, electronic image distribution websites, or user provided images.

7. The computer-implemented method of claim 3, further comprising:
receiving an indication that the tracking information is outside the tracking threshold;
receiving additional image data captured by the computing device; and
causing additional content to be overlaid on the additional image data.

8. The computer-implemented method of claim 3, wherein the tracking information corresponds to at least one of a position of a representation of the visual feature relative to the computing device or timestamp information that corresponds to one of a time of day and a time of year the image data is captured.

9. The computer-implemented method of claim 8, further comprising:
receiving an indication that the position of the visual feature is outside a position threshold of the tracking threshold; and
causing the content rendered in the overlay element that overlays the image data displayed on the computing device to be updated.

10. The computer-implemented method of claim 8, further comprising:
receiving an indication that the timestamp information is outside a temporal threshold of the tracking threshold; and
causing the content rendered in the overlay element that overlays the image data displayed on the computing device to be updated.

11. The computer-implemented method of claim 3, further comprising:
enabling a user to perform at least one of indicating that the content is helpful, associating additional content with the point of interest, or outlining a display area to associate additional content to the point of interest.

12. The computer-implemented method of claim 3, further comprising:
enabling a user of the computing device to customize a display of the content by indicating a type of content associated with the visual feature.

13. The computer-implemented method of claim 3, wherein the content is displayed on the computing device with at least one of glowing effect, bold effect, billboard effect, or a visual three-dimensional element.

14. The computer-implemented method of claim 3, further comprising:
determining one of a rotation or a tilt of the computing device relative to a viewer of the computing device;
determining additional content based at least in part on a direction of the one of the rotation or the tilt; and
displaying at least the additional content on the computing device.

15. A computing system, comprising:
a processor;
memory including instructions that, when executed by the processor, cause the computing system to:
receive image data of a point of interest captured by a camera of a computing device, the point of interest associated with an external content provider storing and maintaining information associated with the image data;
receive device data associated with position information and orientation information of the computing device at a time of capturing the image data;
analyze the image data using at least one image processing technique to determine a visual feature that represents a visual aspect of the point of interest;
receive tracking information associated with the visual feature;
determine whether the tracking information is within a tracking threshold;
match, in response to the visual feature being within the tracking threshold, the image data to stored information maintained by an application provider, the image data based on the visual feature, the position information, and the orientation information, the stored information corresponding to a one or more items used to determine an item matching to the visual feature, the items associated with the external content provider, the application provider and the external content provider being separate entities;
determine a set of candidate images based at least in part on one of an updated location identifier, updated orientation of the computing device, or timestamp associated with the set of candidate images;
compare the image data with at least a subset of the set of candidate images;
determine a confidence score for each of the subset of the set of candidate images;
select an image from the subset of the set of candidate images that has the highest confidence score;
retrieve content associated with the item matched to the visual feature of the image selected from the subset of the set of candidate images that has the highest confidence score, the content provided by the external content provider;

provide the content for display with the image data on the computing device; and cause the content to be rendered in an overlay element that overlays the image data displayed on the computing device; and in response to determining that the tracking information associated with the visual feature is outside the tracking threshold, receiving updated image data to determine updated content associated with the visual feature, wherein the updated content includes a new type of content.

16. The computing system of claim 15, wherein the instructions when executed further cause the computing system to:

determine a plurality of candidate images based at least in part on the position information and the orientation information;

compare the image data with at least a subset of the plurality of candidate images using at least one image matching algorithm;

determine a confidence score for each compared candidate image of the subset of the plurality of candidate images; and select an image associated with the highest confidence score.

17. The computing system of claim 15, wherein the image data is matched to stored information remote from the computing device, and wherein information corresponding to one or more items is stored in a remote repository, and wherein the overlay element augments the image data by overlaying the content, and wherein the overlay element is selected from one of a box, a button, a three-dimensional (3D) structure, an animation, audio, video, Web page, or interactive user interface.

18. The computing system of claim 15, wherein the content includes elements selectable by a user of the computing device, the elements including at least one of a button or a hyperlink.

* * * * *